US008967357B2

(12) United States Patent
Houssian et al.

(10) Patent No.: US 8,967,357 B2
(45) Date of Patent: Mar. 3, 2015

(54) GRAIN AUGER BLOW-OUT DOOR

(71) Applicant: Meridian Manufacturing, Inc., Storm Lake, IA (US)

(72) Inventors: Terry Douglas Houssian, Saskatchewan (CA); Bradley Metro Zazula, Saskatchewan (CA)

(73) Assignee: Meridian Manufacturing Inc. (CA)

( * ) Notice: Subject to any disclaimer, the term of this patent is extended or adjusted under 35 U.S.C. 154(b) by 33 days.

(21) Appl. No.: 13/917,383

(22) Filed: Jun. 13, 2013

(65) Prior Publication Data
US 2014/0367225 A1  Dec. 18, 2014

(51) Int. Cl.
*B65G 33/14* (2006.01)
*B65G 33/08* (2006.01)

(52) U.S. Cl.
CPC ........ *B65G 33/14* (2013.01); *B65G 2814/0319* (2013.01); *B65G 33/08* (2013.01)
USPC ................. 193/14; 210/131; 193/9; 198/670; 198/671; 198/860.4; 198/530; 198/550.2

(58) Field of Classification Search
CPC ...... B65G 11/20; B65G 11/206; B65G 33/14; B65G 65/44; B65G 2814/0319

USPC ........ 193/4, 9, 14; 198/530, 532, 550.2, 670, 198/671, 735.1, 860.4; 210/131
See application file for complete search history.

(56) References Cited

U.S. PATENT DOCUMENTS

| | | | | |
|---|---|---|---|---|
| 3,232,419 | A * | 2/1966 | Rasmussen | 198/661 |
| 5,348,138 | A * | 9/1994 | Seemann | 198/671 |
| 5,845,762 | A * | 12/1998 | Stark | 198/550.1 |
| 6,691,852 | B1 * | 2/2004 | Nolin | 193/2 A |

FOREIGN PATENT DOCUMENTS

WO    WO 2009067816 A1 *  6/2009

* cited by examiner

*Primary Examiner* — Leslie A Nicholson, III
(74) *Attorney, Agent, or Firm* — McKee, Voorhees & Sease

(57) ABSTRACT

A grain auger having a discharge chute with a primary opening is also provided with at least one secondary opening and a door movable between opened and closed positions relative to the secondary opening. The door is normally closed by spring bias, but will open if the primary discharge opening becomes blocked, thereby releasing grain through the secondary opening, to prevent damage to the auger.

13 Claims, 7 Drawing Sheets

GRAIN AUGER BLOW-OUT DOOR

FIELD OF THE INVENTION

This invention generally relates to grain augers used to fill grain bins, and particularly to an improved grain auger outlet end having a blow-out door to prevent damage to the auger when grain builds up in the discharge end of the auger.

BACKGROUND OF THE INVENTION

Grain bins are typically filled using a long, inclined grain auger having a lower end with an inlet and a raised upper end with an outlet positioned over the fill opening in the roof of the grain bin. The outlet has a chute extending into the roof opening to direct grain into the bin. An auger flighting extends through a tube to carry grain from the inlet end to the outlet end of the auger. It is difficult for the farmer or user to see or recognize when the bin has reached its maximum capacity, since the outlet of the auger extends through the grain bin roof such that the outlet is not visible from the ground. If grain builds up in the discharge end of the auger, the auger flighting may become plugged which can lead to damage of the auger flighting or burnout of the auger motor. One prior art solution to overcome this problem is to have a person climb onto the roof of the grain bin to visually observe when the bin is full, so that the auger can be turned off. However, such positioning of a person creates safety concerns.

Accordingly, a primary objective of the present invention is the provision of an improved grain auger which prevents buildup of grain in the discharge end of the auger.

Another objective of the present invention is the provision of an improved grain auger having at least one blow-out door in the discharge end to release grain in the event of a grain backup in the outlet end of the auger.

A further objective of the present invention is the provision of a grain auger having a primary outlet at the discharge end and a secondary outlet normally covered by a door which can open if the primary outlet becomes blocked.

Still another objective of the present invention is the provision of a grain auger having a blow-out door on the discharge end which is normally closed and movable to an open position if grain builds up in the discharge end of the auger, so as to allow grain to flow out the door opening.

SUMMARY OF THE INVENTION

The grain auger of the present invention includes a tubular housing with a lower inlet end and an upper outlet or discharge end. Auger flighting extends through the tube to carry grain from the inlet end to the outlet end. A chute defines a primary outlet in the outlet end of the tube and discharges grain into a grain bin when the flighting is rotated. A secondary outlet is provided in the outlet end of the grain auger. A door is pivotally attached to the discharge end of the auger and is spring biased so as to normally close the secondary outlet. If grain builds up in the outlet end of the auger, the pressure will force the door open, against the bias of the spring, to allow grain to be expelled through the secondary outlet, and thereby prevent damage to the auger.

DETAILED DESCRIPTION OF THE PREFERRED EMBODIMENTS

Figure 1:
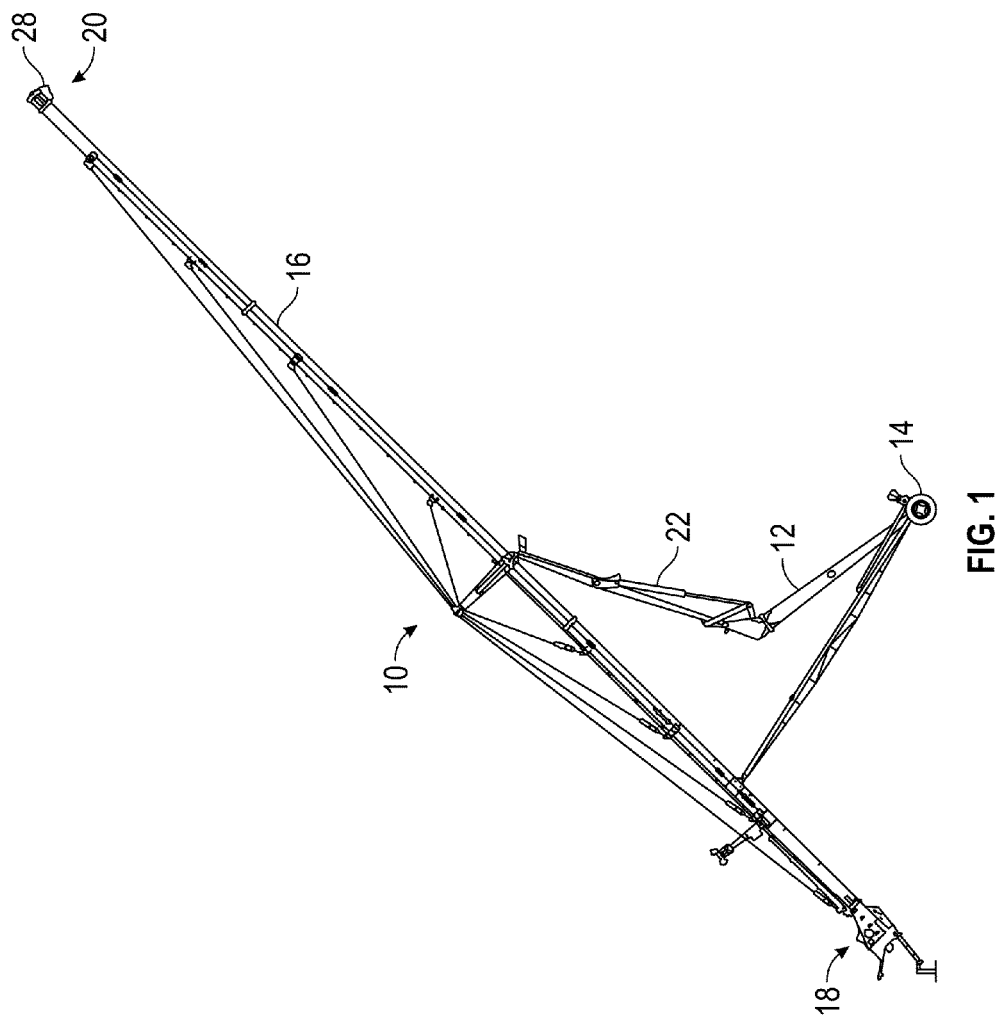
FIG. 1 is a perspective view of a grain auger having a pair of blow-out doors according to the present invention.

The improved auger of the present invention is generally designated by the reference numeral 10 in FIG. 1. The auger 10 includes a frame 12 supported by a pair of wheels 14. The auger also includes an elongated tubular housing 16 having a lower inlet end 18 and a raised outlet or discharge end 20. The discharge end is also called the head. A flighting (not shown) extends through the tube 16 to convey grain from the inlet end 18 to the outlet end 20. A motor (not shown) is provided for rotating the auger flighting. The frame 12 can be raised and lowered by a hydraulic cylinder 22.

The improvement to the auger 10 according to the present invention is the provision of a door 24 adjacent the outlet end of the auger tube 16, as shown in FIGS. 2-7. While the drawings show a pair of doors 24 on opposite sides of the tube 16, it is understood that a single door can be utilized.

Each door 24 is pivotally mounted to the auger housing by a hinge 26. The doors 24 are positioned above the discharge chute 28, which defines the primary discharge opening 30 for the auger 10.

Figure 2:
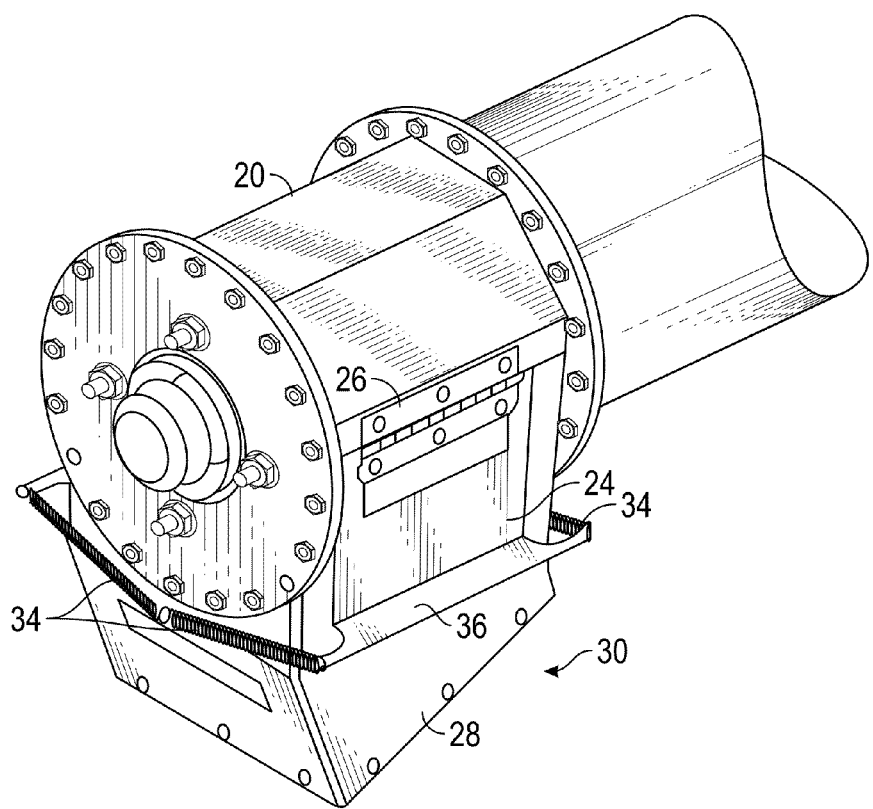
FIG. 2 is a perspective view of the discharge end of the auger showing a blow-out door is in a closed position, according to the present invention.
Figure 3:
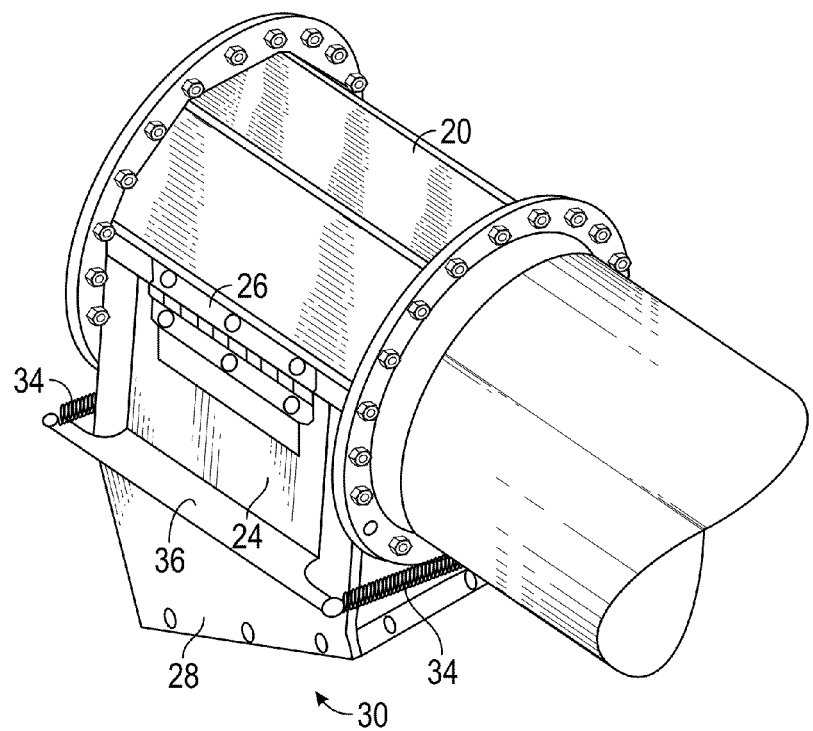
FIG. 3 is another perspective view of the discharge end of the auger with the blow-out door being in a closed position.
Figure 4:
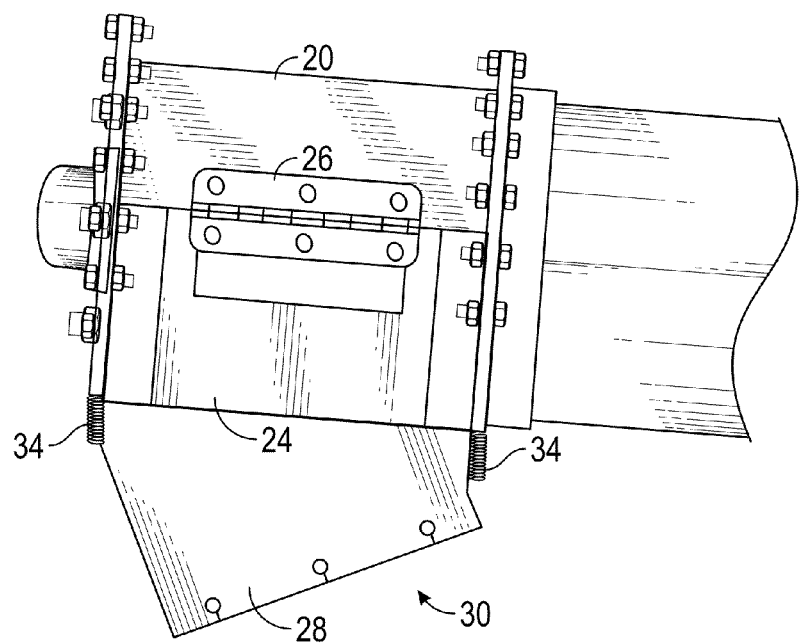
FIG. 4 is a side elevation view of the discharge end of the auger with the blow-out door in a closed position.
Figure 5:
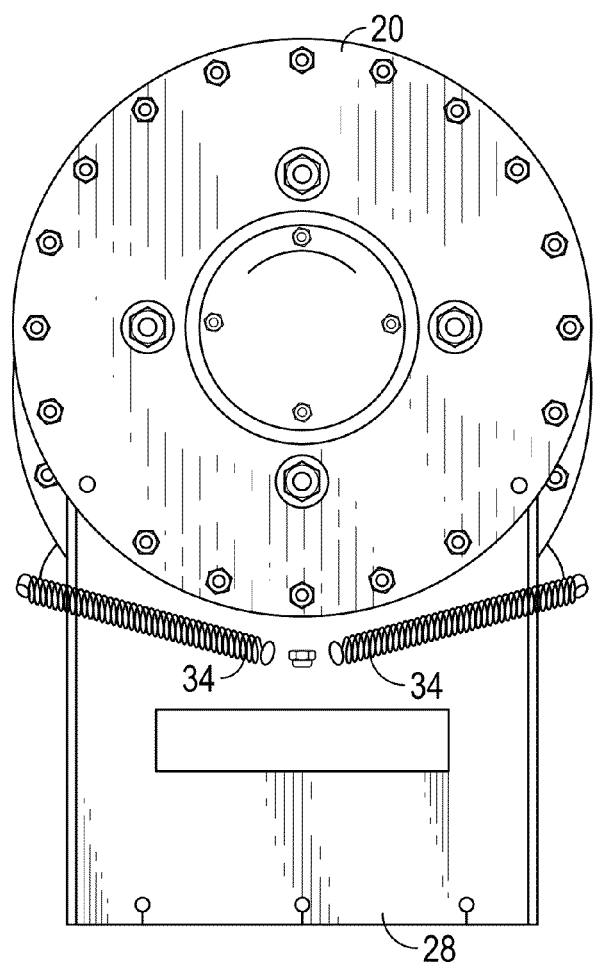
FIG. 5 is an end view of the auger with the blow-out doors in a closed position.
Figure 6:
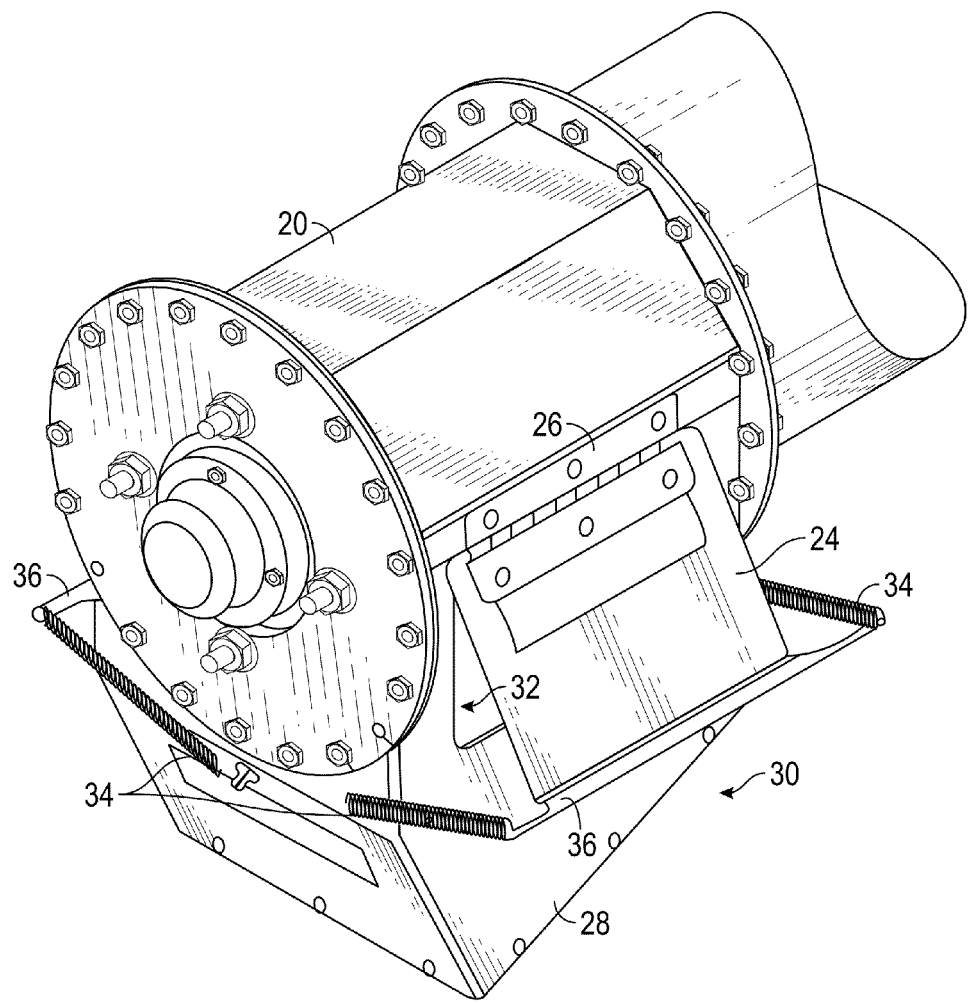
FIG. 6 is a perspective view of the discharge end of the auger with the blow-out door in an open position, according to the present invention.
Figure 7:
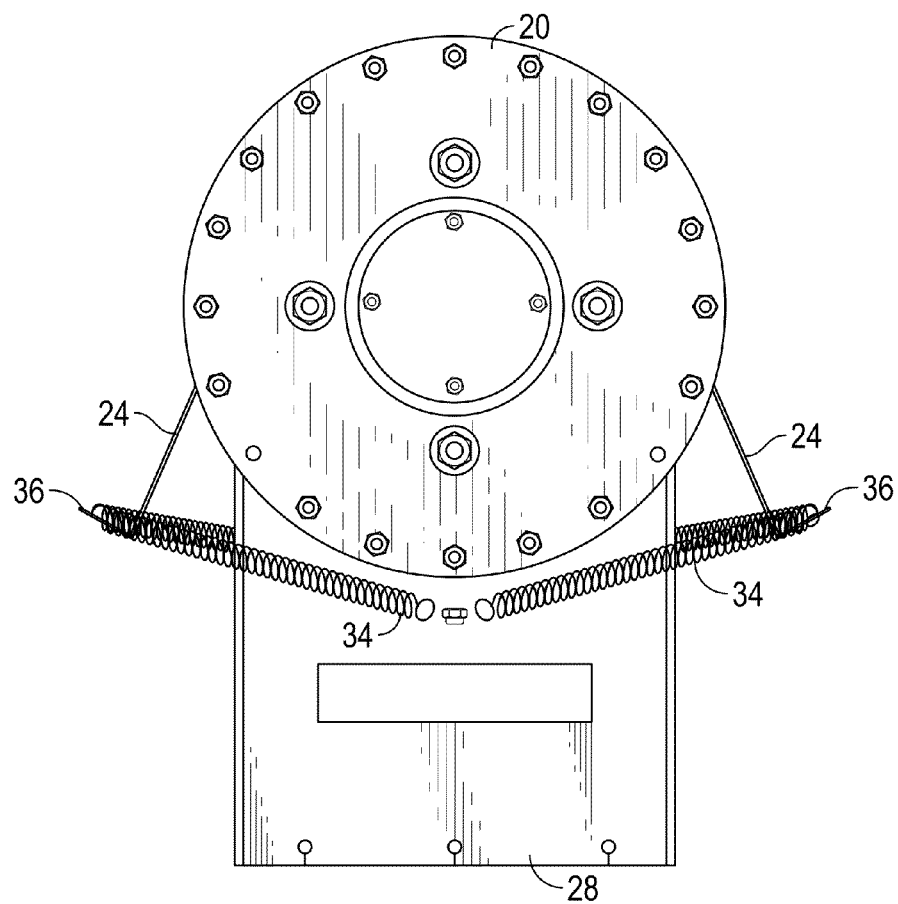
FIG. 7 is an end view of the auger with the pair of blow-out doors both in an open position.

The doors 24 are movable between a normally closed position, as seen in FIGS. 2-5, in covering relation to a secondary discharge or door opening 32, and an open position, as shown in FIGS. 6 and 7. The doors 24 are normally biased to a closed position by one or more springs 34 extending between the housing 16 and the door 24. As best seen in FIGS. 2 and 3, each door 24 has a lower flange 36 extending outwardly to which one end of the spring 34 is attached.

During normal operation of the auger 10, the doors 24 are closed via the force of the springs 34. If the discharge chute 28 becomes plugged or clogged while the auger flighting is operating, the buildup of pressure within the outlet end 20 of the tubular housing 26 will force the doors 24 open, against the bias of the springs 34, such that grain can fall out the secondary openings 32. When the pressure is reduced, the doors 24 will return to their closed positions via the bias of the springs 34.

Thus, when the auger 10 is operating, the grain will seek the path of least resistance, which normally is through the chute 28 and out the primary opening 30. However, if the primary opening 30 becomes blocked, the path of least resistance will be through the opened doors 24 and the secondary openings 32.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of conveying grain, comprising:
introducing the grain into an inlet opening at an inlet end of an auger tube;
conveying the grain through the tube;
discharging the grain through an outlet opening at an outlet end of the tube;
if the outlet opening becomes plugged, pivotally opening a door mounted on the outlet end of the tube in covering relation to a secondary opening to discharge grain from the secondary opening.

2. The method of claim 1 further comprising biasing the door to a closed position over the secondary opening.

3. The method of claim 1 further comprising maintaining the door in a closed position when the primary outlet opening is not plugged.

4. The method of claim 1 wherein the door automatically opens when the primary outlet opening becomes plugged.

5. The method of claim 4 wherein the grain pressure within the tube forces the door open when the primary outlet opening is blocked.

6. The method of claim 1 wherein the pivotal movement of the door is about an upper edge of the door.

7. The grain auger of claim 1 wherein the pivotal movement of the door is about an axis parallel to a longitudinal axis of the tube.

8. A method of augering grain through a tube with an inlet, first and second outlets, and an auger extending from the inlet to the outlets, comprising:
maintaining the first outlet normally open;
maintaining the second outlet normally closed;
operating the auger to move grain from the inlet to the outlets;
discharging grain only through the first outlet, unless the first outlet becomes blocked, and then opening the second outlet to discharge grain from the second outlet while the first outlet is blocked.

9. The method of claim 8 further comprising normally closing the second outlet with a door.

10. The method of claim 9 further comprising biasing the door to a normally closed position over the second outlet.

11. The method of claim 9 further comprising opening the door by pressure of grain against the door when the first outlet is blocked.

12. The method of claim 11 further comprising automatically opening the door when the grain pressure increases to a pre-determined level.

13. The method of claim 8 further comprising providing a biasing force to close the door and automatically open the door when grain pressure in the tube against the door exceeds the biasing force.

* * * * *